RECORD PLAYER

Filed June 5, 1964

INVENTORS
WARREN M. MINER
AKIRA A. YAMASAKI
BY Raymond W. Colton
ATTORNEY

April 30, 1968 W. M. MINER ET AL 3,380,743

RECORD PLAYER

Filed June 5, 1964 8 Sheets-Sheet 2

INVENTORS

WARREN M. MINER

AKIRA A. YAMASAKI

BY Raymond Wootton

ATTORNEY

April 30, 1968 W. M. MINER ET AL 3,380,743

RECORD PLAYER

Filed June 5, 1964 8 Sheets-Sheet 3

INVENTORS

WARREN M. MINER

AKIRA A. YAMASAKI

BY

Raymond W. Wootton

ATTORNEY

RECORD PLAYER

Filed June 5, 1964

INVENTORS
WARREN M. MINER
AKIRA A. YAMASAKI
BY Raymond W. Wootten
ATTORNEY

RECORD PLAYER

INVENTORS
WARREN M. MINER
AKIRA A. YAMASAKI
BY
Raymond Wootton
ATTORNEY

April 30, 1968 W. M. MINER ET AL 3,380,743

RECORD PLAYER

Filed June 5, 1964 8 Sheets-Sheet 6

INVENTORS

WARREN M. MINER
AKIRA A. YAMASAKI

BY

Raymond Wheeler

ATTORNEY

RECORD PLAYER

Filed June 5, 1964 8 Sheets-Sheet 7

INVENTORS
WARREN M. MINER
AKIRA A. YAMASAKI
BY Raymond Wootton
ATTORNEY

RECORD PLAYER

INVENTORS
WARREN M. MINER
AKIRA A. YAMASAKI
BY Raymond W. Colton
ATTORNEY 3,380,743

RECORD PLAYER

Warren M. Miner, Brooklyn, and Akira A. Yamasaki, Tappan, N.Y., assignors to The Solocast Company, a corporation of Connecticut Filed June 5, 1964, Ser. No. 372,817

4 Claims. (Cl. 274—13)

This invention relates to a compact portable record player adapted for playing while in motion. The invention is particularly adapted for control of the stylus during its traversing movements.

The invention is applicable to a stylus carriage which is traversed across the record in geared relation to the turntable in order to assure that the stylus is mechanically advanced at the proper rate, as described in copending application Ser. No. 372,815, filed June 5, 1964, having the same assignee as the present invention.

One feature of the invention is an arrangement to mount the stylus resiliently for movement into playing position or for lifting movement away from engagement with the record as in returning the stylus to the starting position. Another feature is a floating mounting to permit the stylus to move laterally during playing to accommodate the stylus to minor variations in the groove spacings of different records.

One feature is a mechanism for lifting the stylus from the record in any position of the stylus carriage so that the record may be interrupted at any point. Where the device contemplates an arrangement for traversing the stylus separately from the turntable drive and at a faster rate for the purpose of scanning the record to skip or repeat a part of the record, one feature of the invention is an arrangement for locking the stylus against lateral movement on the carriage during this scanning.

In accordance with the invention, the record player has a stylus arrangement in which the carriage for the stylus is mounted for rectilinear motion and the stylus is supported from the carriage by an intermediate support which is pivoted to the carriage on an axis parallel to the rectilinear carriage movement, for movement of the stylus toward and away from the record, and the stylus mounting is pivoted on the intermediate support on an axis at right angles to the carriage movement and at right angles to the plane of the record, thereby permitting traversing of the stylus with respect to the carriage in a plane parallel to the record.

Other features and advantages will be apparent from the specification and claims, and from the accompanying drawings which illustrate an embodiment of the invention.

Figures 1, 2:
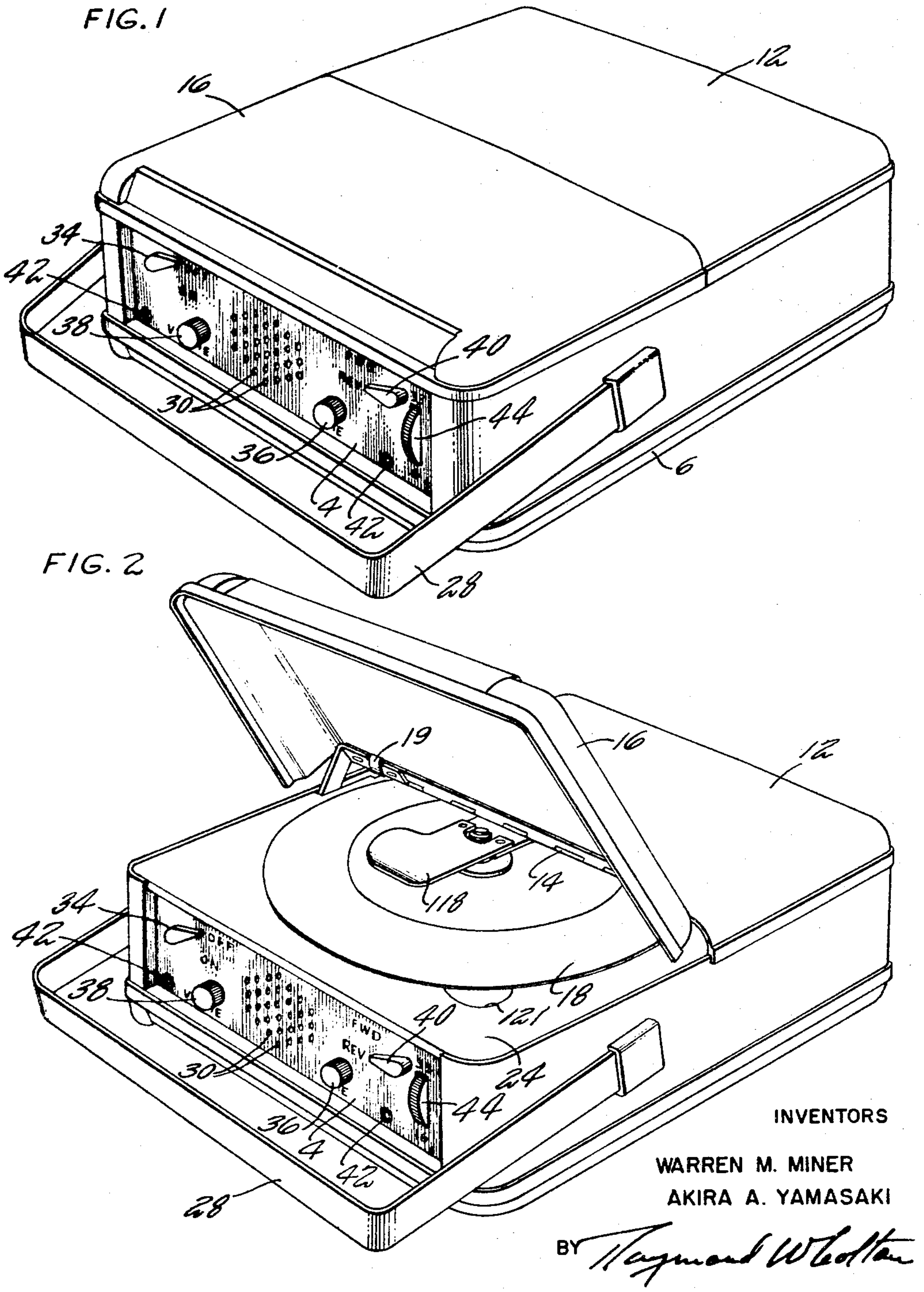
FIG. 1 is a perspective view of the device with the cover closed.
FIG. 2 is a view similar to FIG. 1 with the cover open.
Figures 3, 4:
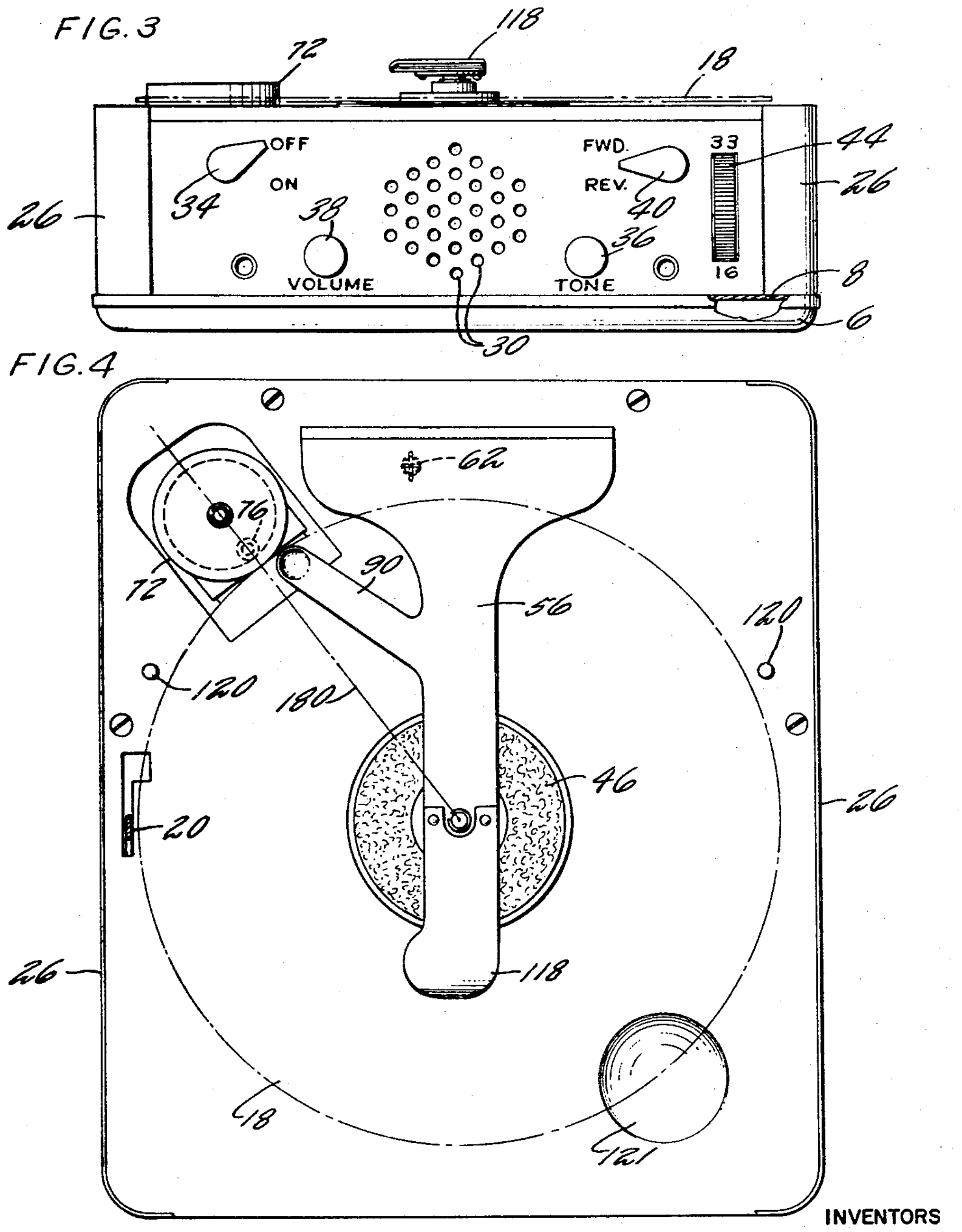
FIG. 3 is a front view of the device with the cover removed.
FIG. 4 is a top view of the device with the cover removed.
Figure 5:
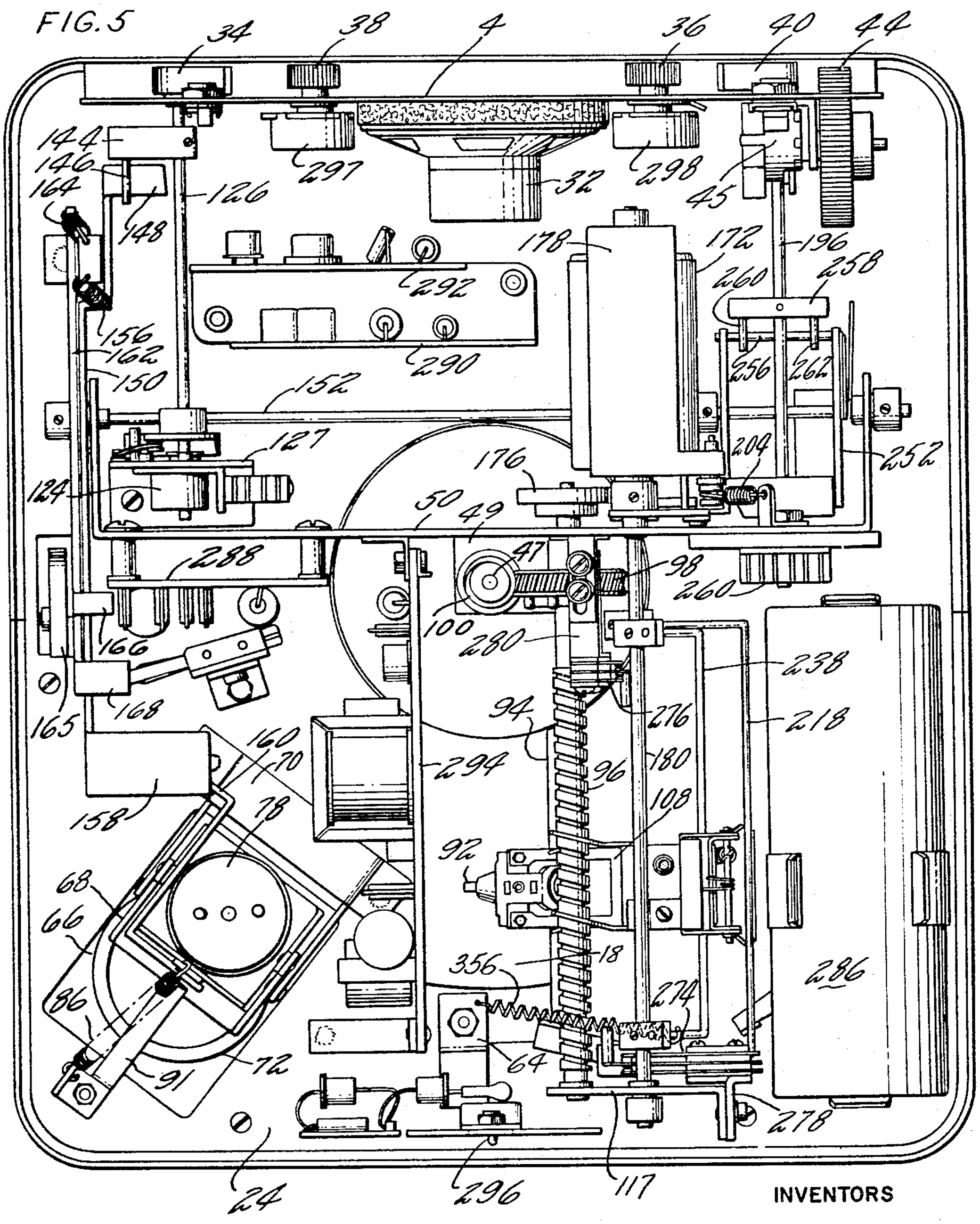
FIG. 5 is an inverted plan view of the mechanism with the bottom cover and a part of the chassis removed.
Figures 6, 7, 8, 9, 10:
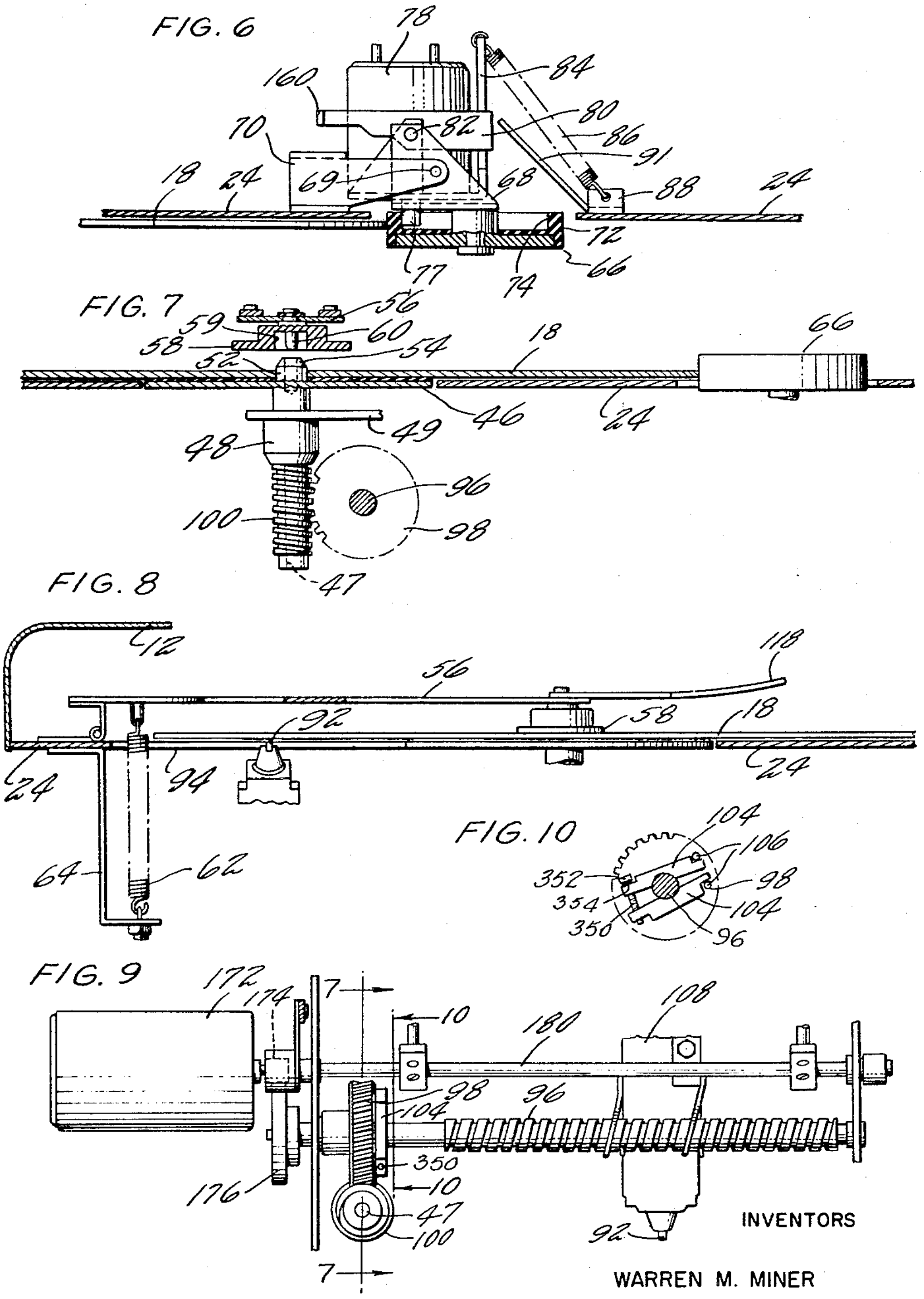
FIG. 6 is a partial side elevation of the device of FIG. 5 showing the driving mechanism for the record.
FIG. 7 is a sectional view through the turntable mechanism; a part of this view being along the line 7—7 of FIG. 9.
FIG. 8 is a fragmentary sectional view through the cover, and the hinged hold-down arm for the record.
FIG. 9 is a plan view of the stylus moving mechanism.
FIG. 10 is a sectional view substantially along the line 10—10 of FIG. 9.

In orienting the several figures showing the details, it will be noted that FIGS. 7 and 8 are shown in the same position as FIGS. 1 and 4 with the record at the top of the device. FIG. 5 has been inverted to show the mechanism more clearly and FIG. 6 as well as FIGS. 9 to 24, inclusive, are positioned with reference to the inverted position of the mechanism of FIG. 5 for reasons of clarity.

The device includes a chassis having a front panel 4 on which the external controls are mounted. A bottom cover 6 is secured to the bottom plate 8 of the chassis in spaced relation thereto and may be hinged between the front and back edges so that the front half may be opened to receive spare records to be positioned between the cover and the bottom plate.

A top cover plate 12 is attached to the chassis and is hinged as at 14 substantially midway between the front and back to provide, in effect, a movable cover 16 which is opened for the removal of or insertion of a record 18. The cover is held selectively in open or closed position by a spring 19, FIG. 18. The cover 16 carries an actuating arm 20, the inner end of which carries a cam engaging roller 22, FIG. 18, the function of which will be described later.

The chassis includes a top plate 24 to which substantially the entire mechanism is attached and which also carries the front panel 4, as shown, for example, in FIG. 5. The bottom plate 8, FIG. 3, of the chassis has side walls 26 and an end wall, not shown, which form enclosures for the mechanism when the bottom plate and top plate are secured in assembled relation. A pivoted handle 28 attached to the side walls 26 provides for easy carrying of the device.

The front control panel 4 has a centrally located grill 30 in back of which is located a loud speaker 32. The panel also carries an on-off control lever 34, a tone control knob 36, a volume control knob 38 and a scanning lever 40 by which to advance or retract the stylus for omtting or repeating a part of a record. The mechanism actuated by this lever will be described later.

The panel also has receptacles 42 for earphone jacks.

A speed control disc 44 projecting through the control panel permits control of the record speed from 16 r.p.m. at one end of the travel of the disc to 33 r.p.m. at the opposite end of the travel. This control may be by a rheostat 45, FIG. 5.

Referring now to FIGS. 4 and 7, the record 18 is supported on a turntable 46 on a shaft 47 journalled in a bearing 48 carried by a bracket 49 on an intermediate frame member 50, FIG. 5, mounted on the plate 24 and forming part of the chassis. The record 18 is supported between the top plate 24 of the chassis and the top cover plate 12 and is held in position on the turntable by a centrally located hollow pin 52 on the upper end of the shaft 47 and extending upward from the turntable. The upper end of this pin may be conical as at 54 to assist in positioning the record on the turntable. A hinged arm 56 secured to the top plate 24 carries a hold-down disc 58 that engages the sufrace of the record opposite to the turntable. The disc has a central recess 59 to receive the pin 52 and has a central projection 60 within the recess that fits within the hollow pin 52 thereby forming a bearing for the pin. In this way, the disc 58 on the hinged arm 56 serves as an additional support or bearing for the turntable on the side opposite to the bearing 48 so that the record is securely held in position within the device with no tilting of the turntable possible. The arm 56 is held in operative position with the hold-down disc engaging the record by a spring 62 extending between the underside of the arm 56 and a bracket 64, FIG. 8, on the chassis.

The record 18 is rotated by a driving pulley or wheel 66, FIGS. 6 and 7, journalled in a bracket 68 which is pivotally supported as by pins 69 on a fixed bracket 70, the latter being attached to the top plate 24. The wheel 66 has a peripheral flange 72, the outer surface of which engages with the periphery of the record 18, as will be apparent. The inner peripheral surface 74 of the flange is engaged by a shaft 77 of a drive motor 78. The motor is mounted on a bracket 80 pivotally mounted as at 82 on the pivoted bracket 68. The pivotal mounting 82 for the motor is parallel to and spaced from the pivotal mounting 69 for the bracket 68 and both of these pivotal mountings are parallel to the plane of the record and substantially tangent to the periphery of the record.

The bracket 80 has a projecting arm 84, the free end of which is connected as by a spring 86 to a mounting bracket 88 attached to the top plate 24. In this way the spring 86 normally urges the shaft 77 into engagement with the driving wheel 66 and also urges the driving wheel against the periphery of the record. To prevent buckling of the record 18, the hinged arm 56 may have a projecting finger 90, FIG. 4, which overlies the periphery of the disc adjacent to the location of the driving wheel. A fixed stop 91 on the plate 24 limits the pivotal movement of the motor and wheel in a clockwise direction, FIG. 6, when there is no record in position.

The record is played through a stylus 92, FIG. 8, which engages with the side of the record adjacent to the top plate 24, this side being opposite to the top cover plate 12. In effect, this can be considered as the underside of the record and the stylus engages the record through a slot 94 in the top plate. The stylus is caused to move radially of the record as the record is rotating through a helically grooved rod or lead screw 96, the latter being rotated by the rotation of the turntable on which the record is carried.

The lead screw 96, FIGS. 7 and 9, has mounted thereon a worm gear 98 which is driven from a worm 100 on the shaft 47 for the turntable. The worm gear carries two frictional clutch elements 104, FIG. 10, on the face thereof in the form of blocks which are in a position to engage on opposite sides of a smooth portion of the lead screw 96 and thereby provide a frictional drive from the worm gear to the lead screw. It will be apparent that the clutch elements will provide a substantial frictional effect dependent on the position of an adjustable screw 350 having a spring 354 between its head 352 and one of the blocks 104. The elements 104 are supported at their ends remote from the screw 350 between a pair of pins 106 projecting into the worm gear. With this arrangement the turntable will be rotated as a result of the record being driven and will provide a rotation of the lead screw 96 in proper timed relation to the rotation of the record thereby to traverse the stylus at the appropriate rate to keep the stylus in the record groove.

Figure 11:
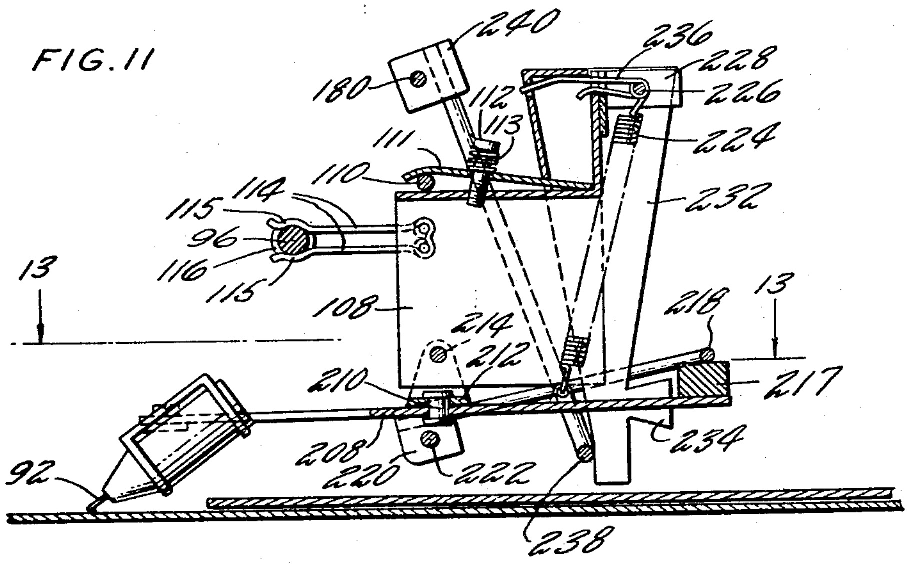
FIG. 11 is a sectional view substantially along the line 11—11 of FIG. 12.
Figure 12:
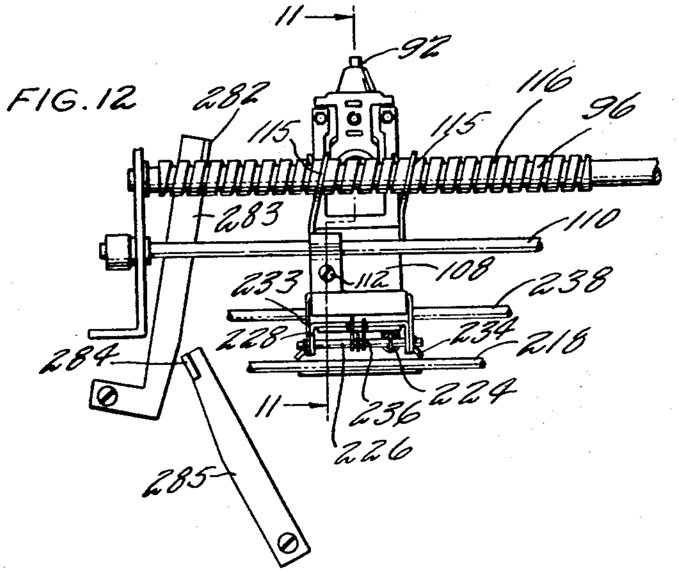
FIG. 12 is a plan view, with parts broken away, of the stylus and its support mechanism.

As shown in FIGS. 11 and 12, a carriage 108 for the stylus is guided by a rod 110 extending parallel to the lead screw 96 and on which the carriage is resiliently held by a clamp 111 held to the carriage by a bolt 112 and spring 113. The carriage is connected to the lead screw by a pair of spring clips 114 secured on opposite sides of the carriage and having projecting fingers 115 positioned on opposite sides of the lead screw 96, as shown, and engaging in the helical groove 116 in the lead screw, as shown in FIG. 12. The lead screw 96 and the guide rod 110 are supported in the intermediate frame member 50 and an end frame member 117, FIG. 5.

The stylus and carriage are shown substantially in mid-position for clarity. Although when the device is not in operation, the stylus is in starting position at the outer periphery of the record (the left end of its travel in FIG. 12). Assuming that the stylus is in starting position, a record is inserted by opening the top cover 16 and raising the thumb latch 118, FIG. 4, on the end of the hinged arm 56. The record is then positioned over the conical end of the hollow pin 52 on the turntable, this positioning being assisted by locating pins 120 projecting from the top plate 24, FIG. 4. A depression 121 in the corner of the top plate allows the user to hold the record more easily while it is being inserted or removed. When the record is in position and the hold-down disc has been placed in contact with the record by the movement of the hinged arm 56 toward the top plate 24, the cover 16 may be closed and the device is ready for operation.

The device is turned on by moving the off-on lever 34 into "on" position. As shown in FIGS. 14 to 17, this lever turns on the amplifier 122, FIG. 25, by closing a switch 123 actuated by a cam 124 carried by the rod 126 to which the on-off lever 34 is attached. The rod 126 is journalled in the panel 4 and in a support bracket 127 mounted on the top plate. The same switch 123 serves to energize the driving motor 78. Another switch 128 is also closed when switch 123 is closed, the purpose for which will appear later. When the control lever 34 is placed in "on" position it is held releasably in this position by the action of a spring 130, FIG. 16, positioned between a fixed pin 132 on the bracket 127 and a pin 136 on an arm 138 secured to the rod 126. It is obvious that this spring 130 will hold the arm 138 either in the full-line "off" position or in the dotted-line "on" position of FIG. 16. The arm 138 carries a projection 140 for engagement with a pin 142 on the bracket 127 which limits the movement of the arm 138 beyond the full-line "off" position shown.

Moving the control lever 34 to "on" position also releases the drive mechanism for the record for movement of the drive mechanism into operative record engaging position. The rod 126 to which the control lever 34 is secured has an arm 144, FIG. 17, in which a projecting pin 146 is mounted. This pin 146 is in a position to engage with a projection 148 carried on the end of a lever 150, FIGS. 14 and 18, this lever being mounted for pivotal movement on a cross rod 152 journalled in end plates 154 on the intermediate frame member 50. A spring 156 holds the projection 148 in contact with the pin 146 and urges the lever 150 in a clockwise direction.

Figures 17, 18, 19:
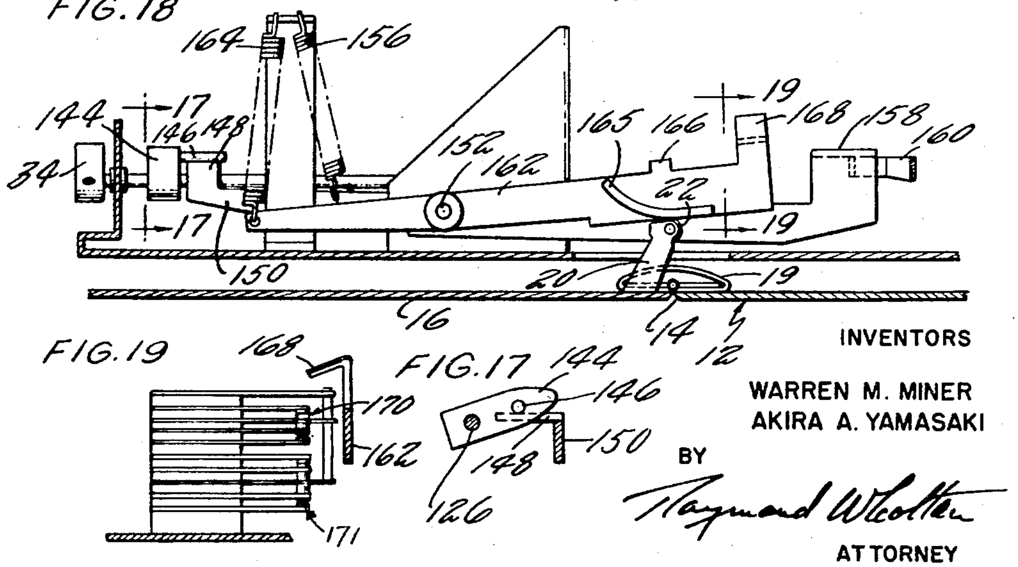
FIG. 17 is a sectional view along the line 17—17 of FIG. 18.
FIG. 18 is a side elevation of the mechanism controlling the main drive motor.
FIG. 19 is a sectional view substantially on line 19—19 of FIG. 18.

Turning the control lever 34 to "on" position moves the projection 148 downwardly thereby moving the lever 150 against spring 156 in a counterclockwise direction and moving the right-hand end of the lever, as seen in FIG. 18, in an upward direction. This end of the lever carries a lateral tab 158 in a position to engage with a bar 160 located on and forming a part of the bracket 80 for the driving motor 78. Upward movement of the right-hand end of the lever 150 accordingly allows the motor bracket 80 and the wheel bracket 68 to move clockwise under the influence of the spring 86 and thus bring the motor pulley into engagement with the driving wheel and the driving wheel into engagement with the periphery of the record.

In front of the lever 150, as seen in FIG. 18, is another lever 162 which is secured to the end of the cross rod 152 and causes the rod to turn with the lever. This lever is normally urged in a clockwise direction by a spring 164. With the cover 16 closed this lever 162 is held in the position shown in FIG. 18 by the roller 22 on the actuating arm 24 carried by the cover 16, this roller engaging an arcuate cam 165 on the lever 162. When the cover portion is opened for the purpose of replacing a record, the actuating arm 20 is moved to the left, FIG. 18, moving the roller 22 to the left on the cam 165. The arm 20 and the roller 22 thereon are moved downwardly by opening movement of the cover thus allowing the lever 162 to move in a clockwise direction. The lever 162 carries a projecting stop 166 thereon FIG. 14, in a position to engage with the edge of the lever 150. In this way as lever 162 moves clockwise it moves lever 150 clockwise with it so that the projection 158 on lever 150 engages and actuates the bar 160 and removes the driving mechanism from engagement with the periphery of the record.

As the levers 150 and 162 move clockwise when the cover 16 is opened, the projection 148 on lever 150 moves upwardly carrying the pin 146 upwardly and thereby moving the control lever 34 into "off" position. This motion also opens the switch 123 for the amplifying system 122 and the motor 78. At the same time a projecting arm 168, FIG. 19, mounted on the lever 162 engages and closes a switch 170 of a pair of switches 170 and 171 as the lever 162 moves clockwise. Closing switch 170 causes return of the stylus 92 to starting position, as will be described. Obviously, the control lever 34 may be manually moved to "off" position as desired, in which event, the lever 150 is moved clockwise under the action of spring 156 to the same position as if the cover were opened.

When a record has been placed in position on the turntable, and the cover 16 is closed, the roller 22 causes the arm 162 to move counterclockwise into the position shown in FIG. 18 thereby opening switch 170 and setting the mechanism in readiness for playing the record merely by turning the control lever to "on" position.

The stylus is returned to starting position by a scanning motor 172, FIGS. 5 and 9, having a pulley 174 in a position to engage with a rubber disc 176 secured on the end of the lead screw 96. When the motor 172 is driving the disc 176 the lead screw turns within the worm gear 98 through the medium of the clutch mechanism 104 above described and the direction of rotation of the motor 172 at this time is such that the stylus will be carried back to starting position. The motor 172 is set to run at a speed to traverse the stylus at a rate considerably faster than the traversing rate while the record is being played.

Figures 20, 21:
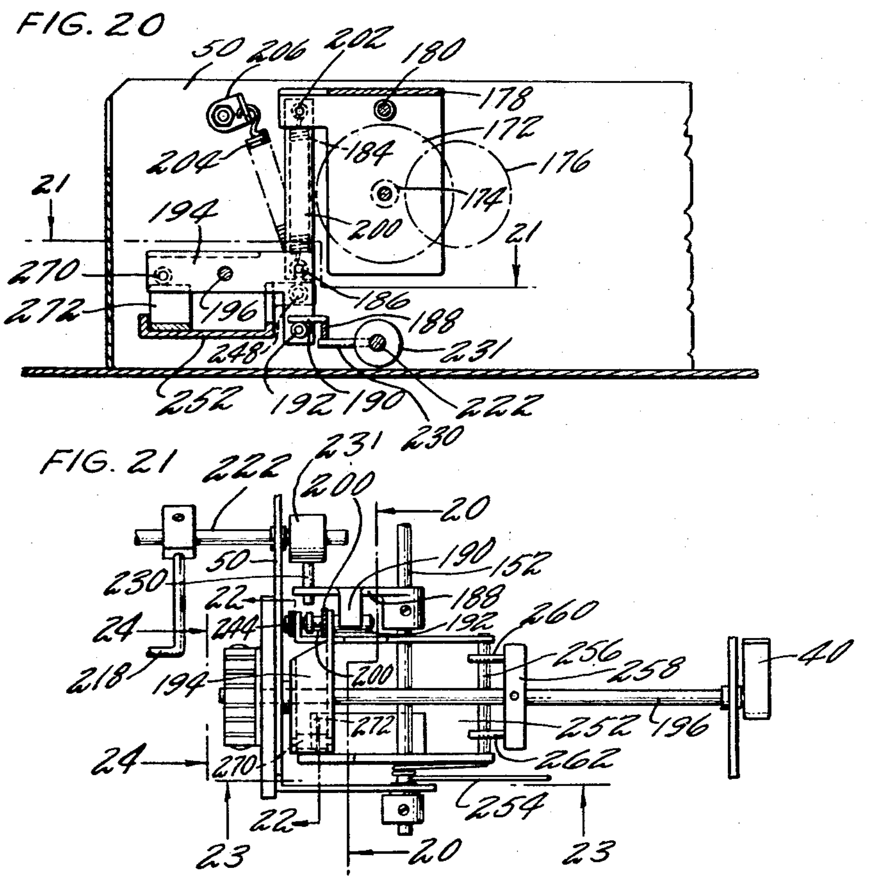
FIG. 20 is a sectional view substantially on line 20—20 of FIG. 21.
FIG. 21 is a fragmentary plan view of the mechanism for operating the scanning motor substantially along line 21—21 of FIG. 20.

The motor 172 is mounted in a bracket 178, FIGS. 5 and 20, pivoted on a rod 180 supported in the intermediate frame member 50 and in the end frame bracket 117. A coil spring 184 between the bracket 178 and a pin 186 urges the motor pulley 174 into driving relation with the disc 176 by rocking the bracket 178 counterclockwise, FIG. 20, about the axis of rod 180. The pin is attached to a bracket 194 to be described later.

The scanning motor 172 is moved into driving engagement with the disc 176 through mechanism actuated by movement of the lever 162 which, as above stated, is moved in response to opening of the lid. The cross rod 152, to the end of which the lever 162 is secured, and which extends crosswise of the chassis in parallel relation to the intermediate frame member 50, has an arm 188 thereon, FIG. 21, adjacent to the motor bracket 178. This arm has a projection 190 in a position to engage with a pin 192 on the bracket 194 which is pivoted on a rod 196 extending at right angles to the rod 152 and journalled in the front panel and in the intermediate frame member 50. The pin 186, to which the spring 184 is attached is also located on the bracket 194 in spaced relation to pin 192. In addition to being engaged by the end of the spring 184, the pin 186 is also engaged by the bifurcated lower end of a link 200, the top end of which is pivoted on a pin 202 on the motor bracket 178 to which the top end of the spring 184 is attached. Thus, when the rod 152 is turned through the action of the clockwise movement of the lever 162, above described, the arm 188 pushes downwardly on pin 192 rocking the bracket 194 clockwise, FIG. 20, and carrying the pin 186 downwardly therewith to cause movement of the motor bracket 178 about the axis of the supporting rod 180 so that the motor pulley engages the rubber disc 176.

The bracket 194 is normally urged in a counterclockwise direction into the position shown by a coil spring 204 thereby to hold the motor 172 in the inoperative position shown. The spring 204 extends between the pin 186 and a bracket 206 attached to the intermediate frame member 50. When the pin 186 is moved downwardly, the bifurcated end of the lever 200 permits the pin 186 to continue to move downwardly after the motor pulley engages the disc 176 thereby resiliently holding the motor in operative position but without causing continued pivotal movement of the motor and its mounting beyond operative position.

Figure 13:
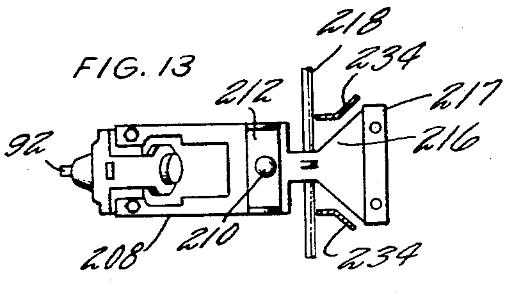
FIG. 13 is a fragmentary plan view of the stylus mount with associated mechanism in section, the view being substantially along the line 13—13 of FIG. 11.
Figures 14, 15, 16:
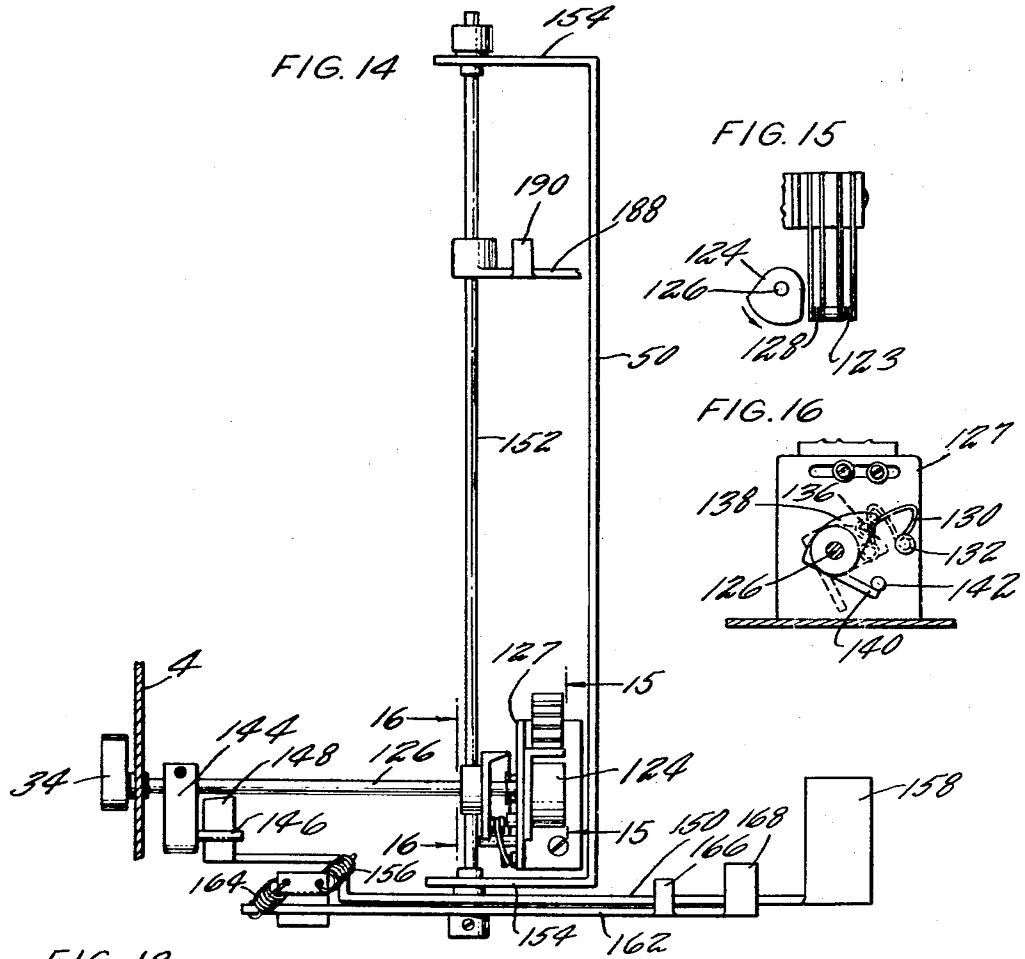
FIG. 14 is a fragmentary plan view of the mechanism actuated by the on-off lever.
FIG. 15 is a sectional view along the line 15—15 of FIG. 14.
FIG. 16 is a sectional view along the line 16—16 of FIG. 14.

The movement of the cover into open position also serves to retract the stylus from engagement with the record during the fast return of the stylus carriage to starting position by motor 172. The stylus mounting which permits this to occur will be described first. As shown in FIGS. 11, 12 and 13, the stylus 92 is carried by a stylus mounting 208 which is supported by a pin 210 on a support 212. The latter is U-shaped and has the ends thereof located on opposite sides of the stylus carriage 108 and supported on a rod 214 in the carriage for pivotal movement with respect to the carriage. The rod 214 extends parallel to the support rod 110 for the stylus carriage. The stylus, stylus mounting and support 212 can move about the axis of this rod for retracting the stylus from contact with the record or for moving the stylus into engagement with the record, as best shown in FIG. 11.

The pin 210, which is at right angles to the pin 214 and at right angles to the plane of the record, permits the stylus mounting to pivot laterally thus carrying the stylus in a direction substantially parallel to the surface of the record, in this way compensating for irregularities in the record grooves.

The mounting 208 has a triangular end portion 216, FIG. 13, remote from the stylus, the top surface of which has a projection 217 which is engaged by the central portion of a movable bail wire 218, movement of which causes movement of the stylus toward or away from the record. The opposite ends of the bail wire are carried in bail mounts 220, FIG. 11, on a rod 222 located below and in parallel relation to the stylus carriage rod 110 and the rod 180. Obviously, turning of the rod 222 will move the central portion of the bail 218 downwardly against the projection 217 on the stylus mounting in any position of the stylus carriage, thus pivoting the mounting on the rod 214 and retracting the stylus from the record. A coil spring 224 extending between the mounting 212 and a pin 226 carried by a pair of projecting lugs 228 on the stylus carriage 108 tends to urge the stylus mounting 208 in a direction normally to keep the stylus in contact with the record. The bail 218 serves to limit the movement of the mounting toward the record and thus limits the pressure of the stylus against the record.

The bail 218 is moved down to retract the stylus when the lid 16 is opened. To accomplish this the arm 188, FIGS. 20 and 21, has its free end in a position to engage with a projecting pin 230 extending from a collar 231 secured to the end of the rod 222. As above stated, the rod 152, which carries the arm 188, is turned when the cover portion 16 is opened and causes return of the stylus to starting position. This turning movement of rod 152 is in a direction to move the free end of the arm 188 downwardly, moving the pin 230 downwardly therewith and carrying the central portion of the bail 218 downwardly. Accordingly, the stylus is moved away from the record surface and held out of contact with the record during the rapid return movement of the stylus to starting position. This return movement of the stylus also occurs as a result of the opening of the lid, as above described.

Lateral movement of the stylus, as above described, is also prevented during certain operations of the device. To accomplish this the pin 226 carried by the stylus carriage supports a downwardly projecting bracket 232 which has its lower end bifurcated to straddle the stylus mounting 208. This bracket has spaced projecting lugs 233 at the top that straddle the projecting lugs 228 on the carriage, as shown in FIG. 12. The lower end of this bracket 232 carries angularly positioned fins 234, FIGS. 11 and 13, the angularity of which corresponds to the triangular shape of the mounting. Pivotal movement of the bracket 232 about the pin 226 to move the fins to the right, as shown in FIG. 11, causes these fins 234 to engage with the triangular portion of the mounting, see FIG. 13, and to prevent any movement of the mounting about the pivot pin 210. A coil spring 236, FIG. 12, normally holds the bracket 232 in the inoperative position shown.

The bracket 232 is moved into operative stylus locking position through a bail wire 238, FIG. 11, the central portion of which is in a position to engage with the lower end of the bracket 232 on the side opposite to the fins 234. The ends of the bail wire 238 are carried in mounts 240 on the rod 180 such that turning of this rod will move the bail wire for shifting the bracket 232 into stylus locking position, against a biasing spring 356.

Figure 22:
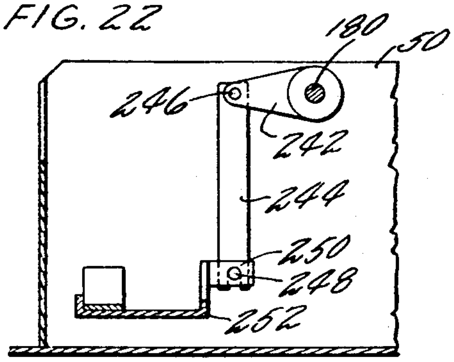
FIG. 22 is a sectional view substantially on line 22—22 of FIG. 21.
Figure 23:
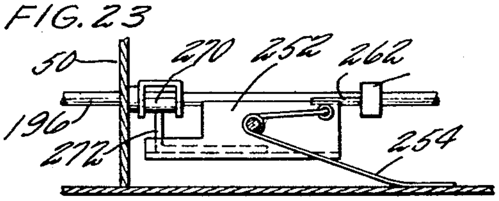
FIG. 23 is a side elevation partly in section, of a part of the mechanism of FIG. 21 along the line 23—23 of this figure.

For turning movement of the rod 180 to actuate the bail wire, the latter has a projecting arm 242, FIG. 22, located adjacent to the intermediate frame member. A link 244 is attached to the free end of this arm as by a pin 246. The lower end of the link 244 is bifurcated and straddles a pin 248 mounted on a projecting arm 250 carried by a pivotally mounted bracket 252. This bracket, as shown in FIGS. 21 and 23, is mounted to pivot on the cross rod 152 and is normally held in the position shown by a spring 254 which urges the bracket in a counterclockwise direction, as seen in these figures, such that a transverse bar 256 on the bracket engages with the rod 196. Clockwise movement of bracket 252 causes upward movement of link 244 and movement of bail 238 into stylus locking position.

The bracket 252 forms a part of a scanning device which is adapted to move the stylus forwardly or in reverse on the record in order to omit or to repeat a part of the recorded material. This movement is faster than the playing rate but slower than the return movement of the stylus to starting position and is under the control of the scanning lever 40 which is mounted on the front end of the rod 196 for turning it. During scanning the stylus mounting 208 is locked against pivotal movement on the pivot pin 210. To do this the rod 195 carries a bar 258 having spaced pins 260 and 262 in a position to engage with the transverse bar 256 carried by the bracket 252. When the scanning lever 40 is turned to cause the stylus to move forward, (inward of the record) the pin 260 is moved downwardly, moving the righthand end of the bracket 252 down, FIG. 21, and thereby pushing up on the link 244 to turn rod 180 and swing the bail wire to the right, FIG. 11, for stopping the free movement of the stylus about the pivot 210. When the lever 40 is moved to reverse the stylus, the pin 262 is moved downwardly with the same resulting movement of the link 244.

Figure 24:
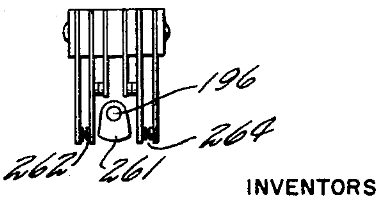
FIG. 24 is a side elevation of a part of the mechanism of FIG. 21 looking in the direction of the arrows 24.

When the scanning lever is moved in either forward or reverse direction, the scanning motor 172 is energized, the direction of rotation of the scanning motor being controlled to assure the proper direction of movement of the stylus. This is accomplished by positioning a cam 261 on the end of the rod 196 where it projects through the intermediate frame member 50. This cam, see FIG. 24, is in a position to engage selectively with a switch 262 for reverse movement of the stylus and a switch 264 for forward movement of the stylus. By the use of two separate switches the motor may be connected for a faster speed of scanning in one direction than in the other.

When the scanning lever is turned in either direction the scanning motor is moved into driving relation with the lead screw through movement of the bracket 194. As shown, this bracket has a transverse pin 270, FIG. 20, in a position to engage with a tab 272 on the bracket 252. Upward movement of this portion of the bracket 252 resulting from movement of the scanning lever to either forward or reverse position will rock the bracket 194 clockwise, FIG. 20, to move the supporting pin 186 down and thereby swing the motor bracket 178 to bring the motor pulley into engagement with the disc 176.

The motion of the stylus carriage is limited at each end by limit switches 274 and 276, FIG. 5, mounted on brackets 278 and 280 on the bracket 117 and the frame member 50, respectively. These switches are in a position to be engaged by the carriage 108 as it reaches the end of its movement in either direction. The limit switch 274 opens the circuit through the scanning motor that causes reverse movement of the stylus, and the switch 276 which is a double switch opens the circuit that causes rotation of motor 172 to move the stylus in a forward direction.

The plate 24 also carries two limit stops 282 and 284 for engagement with the stylus mount 208 at opposite ends thereof at the starting position for the stylus. These stops are on brackets 283 and 285, respectively, which are adjustably mounted on the plate 24. In this way the stylus is located centrally of its traversing movement on the carriage about the axis of pin 210 and in a position to assure contact of the stylus with the beginning of the groove in the record.

Referring now to FIG. 5, the record player is powered by a rechargeable battery 286 which supplies energy to both driving and scanning motors and also for the necessary amplifying circuit carried by circuit panels 288, 290, 292 and 294 on the plate 24. Any suitable circuits, preferably transistorized, may be utilized between the stylus and the speaker. Such circuits are now well known and conventional. The tone control knob 36 and the volume control knob 38 may actuate directly suitable rheostats 297 and 298. Similarly the speed control disc 44 controls the rheostat 45 associated therewith. The battery may be recharged from a charging transformer 295 which is connected to the device by a conventional plug 296, FIG. 5, located in the rear wall of the device.

Figure 25:
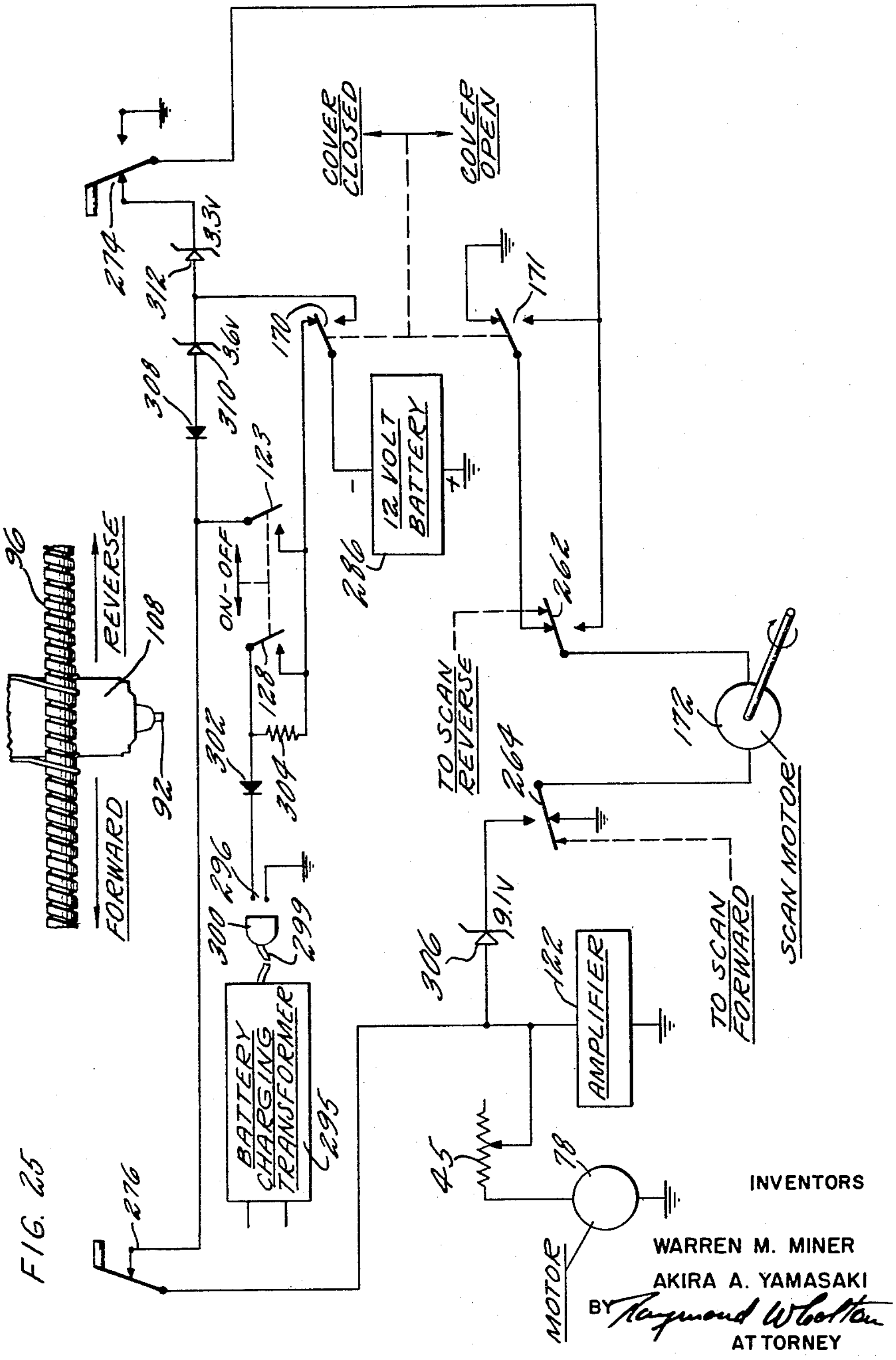
FIG. 25 is a wiring diagram.

As shown in FIG. 25, the transformer 295 may be releasably connected to the device through an electric cord 299 having a socket 300 at the end to engage the plug 296. When the plug is engaged, the battery is charged through a rectifier 302, a current limiting resistor 304 and the switch 170 actuated by the lid and in the position shown when the lid is closed. The switches in FIG. 25 are shown in their normal positions when the device is not in operation, the cover is closed, the "on-off" switch is "off" and the scan control lever is in its "off" position.

The device may operate either from the battery (unplugged) or from the charging transformer. Turning the "on-off" switch to "on" position moves both switches 123 and 128 which comprise the "on-off" switch into closed position. The amplifier 122 and drive motor 78 are energized through switch 123 and through limit switch 276 which is normally closed and the device is in operation.

The switch 128, being closed, shorts out the resistor 304 so that the transformer is supplying power for operation. If the tranformer is unplugged, the battery will supply power to the amplifier and motor 78 through the same control switch 123.

If the scan lever is moved to advance the stylus carriage, switch 264 is closed to complete a circuit through the battery, switches 123 and 276 and a Zener diode 306 to the scan motor 172 and thence through switches 262 and 171, both being in the full-line position shown. This actuates the motor at a speed determined by the diode 306 and in a direction to advance the stylus. Release of switch 264 returns it to the position shown and will ground the motor terminals and provide dynamic braking for the motor.

If the scan lever is moved to reverse the stylus carriage, switch 262 is moved to closed position. When this occurs the battery supplies power through switches 170 and 123, a rectifier 308, Zener diodes 310 and 312 in series, the switch 274, the now closed switch 262 and through the motor to the grounded switch 264. The motor is now rotated at a speed determined by the two diodes and in a direction to reverse the stylus and to move it toward the outer periphery of the record. Releasing switch 262 will ground the terminals of motor 172 and dynamically brake the motor.

When the cover 16 is opened switches 170 and 171 are moved as indicated in FIG. 25. The stylus carriage is returned rapidly to starting position by power supplied to motor 172 through switch 70, diode 312, limit switch 274, switches 171 and 262, and through the motor and switch 264. When the carriage reaches starting position it opens switch 274 to stop the carriage, the motor being dynamically braked again by grounding the motor terminals through switch 274. The rectifier 308 prevents the continued operation of the drive motor and amplifier when the cover is open. With switch 170 in the cover open position power could otherwise be supplied through this switch and diode 310 to switch 276 and the driving motor and amplifier.

By proper selection of the Zener diodes the rotational speeds of the scan motor may be selected for a relatively slow forward scan, a faster reverse scan, and an even faster carriage return when the cover is opened or the "on-off" switch is turned "off." The drawing indicates suitable sizes for diodes for a particular installation where a twelve volt battery is used. As above stated, this switch may be actuated manually or is automatically turned "off" when the cover is opened. When the cover is closed the switches are again in the position shown in readiness to play a record.

In operation, assuming no record is in place and the cover is closed, a record is placed on the turntable by opening the cover and lifting up on the thumb latch end of the lever 56. A record is placed on the turntable and the lever 56 is released. Spring 62 urges the lever 56 toward the record to position the hold-down disc on the record. The cover is closed and the device is ready to operate. With the cover closed the lever 162 is held in the position shown in FIG. 18 by the cam 165 engaging against the roller 22. The lever 150 is held in the position shown in this figure by the pin 146 thus keeping the driving motor 78 and wheel 66 in inoperative position. The arm 168 is out of contact with switches 170 and 171 and they are in the position shown.

To play the record, the on-off control lever 34 is moved to "on" position. This moves lever 150 clockwise to allow the driving mechanism to move into operative position under the action of spring 86. Movement of control lever 34 also closes the switch 123 for the driving motor and amplifying circuit, and the switch 128 to short circuit the resistor 304. Rotation of the record by the driving mechanism drives the turntable and thus, through the worm gear 98 drives the lead screw 96 to advance the stylus at playing speed. This motion will normally continue until the record is finished at which time the circuit through motor 78 and amplifier will be broken by the limit switch 276 and the device will be stopped.

Should the user wish to omit a part of the record while it is playing he moves the scan lever 40 to "forward" position. Movement of this lever operates to move the scanning motor 172 into operative position through the bracket 252, which moves bracket 194 and thus allows link 200 to move down, FIG. 20 to cause the motor pulley to engage the disc 176. The movement of the scan lever also through the medium of cam 260 closes the switch 264 to complete a circuit through motor 172. The motor 172 then drives the lead screw to advance the stylus at a faster rate than the normal forward rate of stylus movement in playing the record. Rotation of the lead screw by motor 172 is permitted by the spring clutch carried by the worm gear 98. This "forward" scanning is at the faster rate as determined by the rating of diode 306. At this time the stylus stays in contact with the record so the user may hear parts of the record during the scanning to determine when to return to normal record playing.

During this scanning movement the free traversing movement of the stylus is locked out since bracket 252 pushes up on link 244 to move bail wire 238 and place bracket 232 in a position to prevent this free traversing movement. This assures that the stylus will move uniformly with the carriage during scanning.

Should the user wish to repeat a part of the record while it is playing he moves the scan lever to "reverse" position. This movement of the lever closes switch 262 to cause rotation of the scan motor 172 in the proper direction to reverse the stylus carriage and also locks the stylus against traversing on pin 210 as above described. This reverse scanning occurs at a speed determined by the rating of the diodes 310 and 312.

When the user wishes to replace a record, whether at the end of the record, or at any time during the playing, the cover is opened. This cover movement moves the roller 22 carried by the cover along the cam 165 allowing lever 162 to move clockwise. The stop 166 on lever 162 engages lever 150 and carries this lever clockwise thereby to return the control lever to "off" position through the medium of the pin 146. This movement of lever 150 also retracts the driving mechanism to inoperative position by means of the arm 160. Movement of lever 162 closes the switches 170 and 171 for energizing the scan motor 172 for rapid return of the stylus to starting position at a rate controlled by diode 312. Movement of the control lever to "off" position also opens the switch 123 for the amplifying circuit for the driving motor 78.

Opening movement of cover 16 also moves scan motor 172 into operative position. As the cover opens and causes clockwise movement of lever 162 which is secured to cross rod 152, this rod turns carrying with it the arm 188. This arm moves bracket 194 clockwise, FIG. 20, to carry pin 186 down and permit the motor 172 to be rocked into driving position.

This same movement of arm 188 moves pin 230, turning rod 232 and moving bail wire 218 into a position to lift the stylus away from the record during the return movement. When the stylus and carriage reach starting position, motor 172 is shut off by the limit switch 274 which also brakes the motor, as above described. The user may now remove the played record and place a new one in position. When the lever 56 is released to hold the record in place and the cover is closed the record player is again ready for use.

It is to be understood that the invention is not limited to the specific embodiment herein illustrated and described, but may be used in other ways without departure from its spirit as defined by the following claims.

We claim:

1. In a record player, a base having a turntable for a record, a guide means on the base, a stylus carriage movable on and guided by said guide means for substantial rectilinear movement over the surface of the record, a stylus, supporting means for said stylus mounted on said carriage, said supporting means including a support and hinge means connecting said support to the carriage on an axis substantially parallel to the carriage mount, a mounting for the stylus, means pivotably connecting said mounting to said support on a second axis substantially at right angles to the axis of said hinge means and to the plane of the record established by the turntable for lateral movement of the stylus over the surface of the record, restraining means supported on said carriage for selectively preventing movement of said mounting about said second axis, said restraining means being pivotably connected to said carriage and having a bifurcated member straddling said mounting for selective engagement with a portion of said mounting, and means for selectively moving said restraining means into and out of engagement with said portion of said mounting means.

2. A record player as in claim 1 in which said restraining means is operative in any position of said carriage.

3. A record player as in claim 1 in which said means for selectively moving the restraining means includes movable bail means.

4. A record player as in claim 1 in which said portion of said mounting has an angled shape, and in which the elements of said bifurcated member are angularly disposed complementarily with respect to said angled shape.

References Cited

UNITED STATES PATENTS

| | | | |
|---|---|---|---|
| 2,881,264 | 4/1959 | Kobler | 274—14 X |
| 3,023,011 | 2/1962 | Wagner | 274—13 X |
| 3,281,153 | 10/1966 | Logan | 274—14 |

NORTON ANSHER, *Primary Examiner.*

CLIFFORD B. PRICE, *Examiner.*

JOSEPH F. PETERS, JR., *Assistant Examiner.*